US007797948B2

(12) United States Patent
Weaver et al.

(10) Patent No.: US 7,797,948 B2

(45) Date of Patent: Sep. 21, 2010

(54) TRANSITION-TO-TURBINE SEAL APPARATUS AND TRANSITION-TO-TURBINE SEAL JUNCTION OF A GAS TURBINE ENGINE

(75) Inventors: Adam J. Weaver, Oviedo, FL (US); Raymond S. Nordlund, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 637 days.

(21) Appl. No.: 11/728,886

(22) Filed: Mar. 27, 2007

(65) Prior Publication Data

US 2008/0236170 A1 Oct. 2, 2008

(51) Int. Cl.
*F02C 7/20* (2006.01)

(52) U.S. Cl. .......................... 60/800; 60/752; 277/401; 277/399

(58) Field of Classification Search .................. 60/800, 60/752; 277/401, 399
See application file for complete search history.

(56) References Cited

U.S. PATENT DOCUMENTS 5,052,694 A * 10/1991 Lipschitz .................... 277/388
5,092,612 A * 3/1992 Victor et al. ................ 277/400
5,769,604 A * 6/1998 Gardner et al. ........... 415/170.1
6,751,962 B1 * 6/2004 Kuwabara et al. ............. 60/800
6,769,257 B2 8/2004 Kondo et al.
6,860,108 B2 3/2005 Soechting et al.
7,044,470 B2 * 5/2006 Zheng ........................ 277/400

* cited by examiner

*Primary Examiner*—Michael Cuff
*Assistant Examiner*—Craig Kim

(57) ABSTRACT

A transition-to-turbine seal (320) including an upstream portion (322) adapted to engage a flange (416) of a transition (400). The upstream portion (322) may be U-shaped in cross-sectional profile and include a primary wall (324) that includes a proximal section (325) and a distal section (326) relative to a hot gas path (170). The proximal section (325) includes a plurality of recesses (327) which are spaced apart and separated by intervening wall (328). In each recess (327) is provided one or more outlets (329) of cooling fluid holes (339). The outlets (329) communicate via the cooling fluid holes (339) with a supply of compressed cooling fluid, such as compressed air that is provided from the compressor. During operation the outlets (329) release this fluid into the respective recesses (327). The flow of cooling fluid provides for a more uniform cooling effect that includes impingement and convective cooling.

16 Claims, 5 Drawing Sheets

TRANSITION-TO-TURBINE SEAL APPARATUS AND TRANSITION-TO-TURBINE SEAL JUNCTION OF A GAS TURBINE ENGINE

FIELD OF INVENTION

The invention generally relates to a gas turbine engine, and more particularly to a seal component between a transition and a turbine of such engine.

BACKGROUND OF THE INVENTION

In gas turbine engines, air is compressed at an initial stage, then is heated in combustion chambers, and the hot gas so produced passes to a turbine that, driven by the hot gas, does work which may include rotating the air compressor.

In a typical industrial gas turbine engine a number of combustion chambers combust fuel and hot gas flowing from these combustion chambers is passed via respective transitions (also referred to by some in the field as ducts and tail tubes) to respective entrances of the turbine. More specifically, a plurality of combustion chambers commonly are arranged radially about a longitudinal axis of the gas turbine engine, and likewise radially arranged transitions comprise outlet ends that converge to form an annular inflow of hot gas to the turbine entrance. Each transition exit is joined by a number of seals each of which bridges a gap between a portion of the exit and one or more turbine components. The latter, in various designs, are identified as row 1 vane segments. Adjacent component growth variances due to thermal expansion, mechanical loads, and vibrational forces from combustion dynamics all affect design criteria and performance of such a seal, referred to herein as a transition-to-turbine seal. Maintenance of component temperatures below particular limits is also desired and this may affect design of the seal and adjacent components. Consequently, the design of such seals has presented a challenge resulting in various approaches that attempt to find a suitable balance between seal cost, reliability, durability, installation and repair ease, performance, and effect on adjacent components.

For example, U.S. Pat. No. 6,751,962, issued Jun. 22, 2004 to Kuwabara et al., provides inclined cooling fluid holes drilled in a tail tube seal in addition to conventionally existing cooling fluid holes. These cooling fluid holes exit into the hot gas path, and are stated to cool the hot gas side of a downstream groove of the seal due to film effect. This is stated to increase reliability and decrease wear. A different approach is taken to cool the transition side of the seal in U.S. Pat. No. 6,769,257, issued Aug. 3, 2004 to Kondo et al. In this patent are disclosed cooling medium and heating medium channels provided in the outlet structure of a transition. Various embodiments are described that are stated to reduce the temperature difference of a flange formed at the downstream end of the transition, which attaches to a sealing component connecting to the turbine. Finally, in U.S. Pat. No. 6,860,108, issued Mar. 1, 2005 to Soechting et al., a seal was directed to prevent the outer and inner shrouds of the turbine's first stationary blade (i.e., row 1 vane segment) from heat damage and wear. The seal comprised a downstream portion having an inclined surface (inclining outwardly from the hot gas path) so that the cross-sectional area defined within the seal increased from an upstream point to a downstream point. Also, outlets for ejecting cooling air were provided that were disposed to release cooling air at the downstream end of the seal. Further, bleed holes were provided toward an upstream end section of the seal, near a front corner of the seal in the hot gas path. The latter are stated to "cool the film" [sic] of the parallel (non-inclined, more upstream) and the inclined (more downstream) surfaces of the seal that are in the hot gas path.

Despite the respective features of these and other transition-to-turbine seals and temperature equilibrating approaches known in the art, there remains a need for an improved transition-to-turbine seal.

BRIEF DESCRIPTION OF THE DRAWINGS

The invention is explained in the following description in view of the drawings that show.

DETAILED DESCRIPTION OF THE INVENTION

Embodiments of the invention provide a number of advances over known transition-to-turbine seals, providing enhanced durability by reducing transition metal temperatures and lowering wear rates of adjacent components such as the transition outlet flange. The inventors have developed a transition-to-turbine seal that takes into account pressure impacts of the more downstream row 1 vanes, in particular that a bow wake from the vanes may provide a slight but significant higher pressure region adjacent to an upstream gap between a flange of a transition and the seal. Appreciating that this could result in a circumferential deflection of cooling fluid flows from the seal through the gap, the inventors obviated such possible impacts in embodiments of the present invention, and thereby advanced the art.

More particularly, embodiments of the present invention comprise a transition-to-turbine seal that comprises a means for keeping a cooling fluid flow in a substantially radial direction after it emanates from the seal, into the gap, and then travels in the gap toward the hot gas path. One disclosed embodiment provides a plurality of flow partitions along a seal wall designed to partially engage the first flange, wherein the flow partitions comprise a plurality of spaced apart recesses, separated by intervening walls, with each recess comprising one or more cooling apertures, so that the presence of the partitions more clearly assures that respective flows will be directed along the entire inside edge of the gap (i.e., in the hot gas path). Such embodiment, and the invention in general, provide a seal that is multi-purpose: it not only achieves a primary sealing function, but it also cools the transition outlet flange and more uniformly purges hot gases from the gap. The cooling of the flange includes both impingement type and convective type cooling, and the flow further provides uniform gap purging and film cooling. The seal achieves these purposes while providing a robust mechanical junction between the seal and the transition outlet flange, this being due in part to the intervening walls that distribute wear load while still providing for unobstructed outflow of cooling fluids from the cooling apertures in the recesses. As a result of reducing the transition outlet flange and seal metal temperatures, a lower wear at this interface is expected. Additionally, the intervening walls will prevent the recesses to collapse from the mechanical and thermal loads imposed on the seal.

Figure 1:
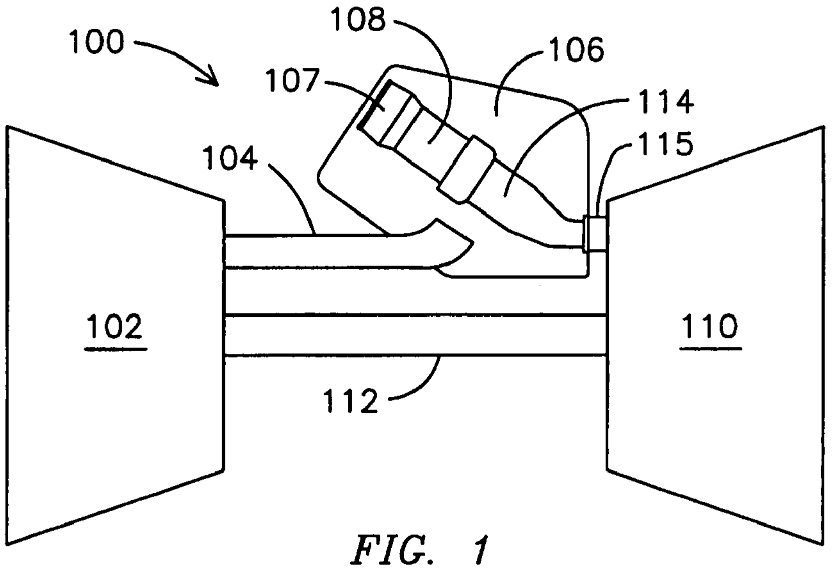
FIG. 1 (PRIOR ART)
FIG. 1 provides a schematic cross-sectional depiction of a prior art gas turbine engine.

Prior to discussion of an exemplary embodiment, a discussion is provided of a common arrangement of elements of a prior art gas turbine engine. FIG. 1 provides a schematic cross-sectional depiction of a prior art gas turbine engine 100 such as may comprise various embodiments of the present invention. The gas turbine engine 100 comprises a compressor 102, a combustor 107 and combustion chamber 108 (such as a can-annular type), and a turbine 110. During operation, in axial flow series, compressor 102 takes in air and provides compressed air to a diffuser 104, which passes the compressed air to a plenum 106 through which the compressed air passes to the combustor 107, which mixes the compressed air with fuel (not shown), and provides combusted gases via a transition 114 to the turbine 110, which may generate electricity. A shaft 112 is shown connecting the turbine to drive the compressor 102. Although depicted schematically as a single longitudinal channel, the diffuser 104 extends annularly about the shaft 112 in typical gas turbine engines, as does the plenum 106. Air from the compressor 102 also travels to the turbine 110 by various channels (not shown in FIG. 1) to provide higher pressure air that surrounds and may enter the hot gas path as it passes through the turbine 110. A junction between the transition 114 and the turbine 110 is indicated by 115, and is the subject of further discussion herein.

Figure 2:
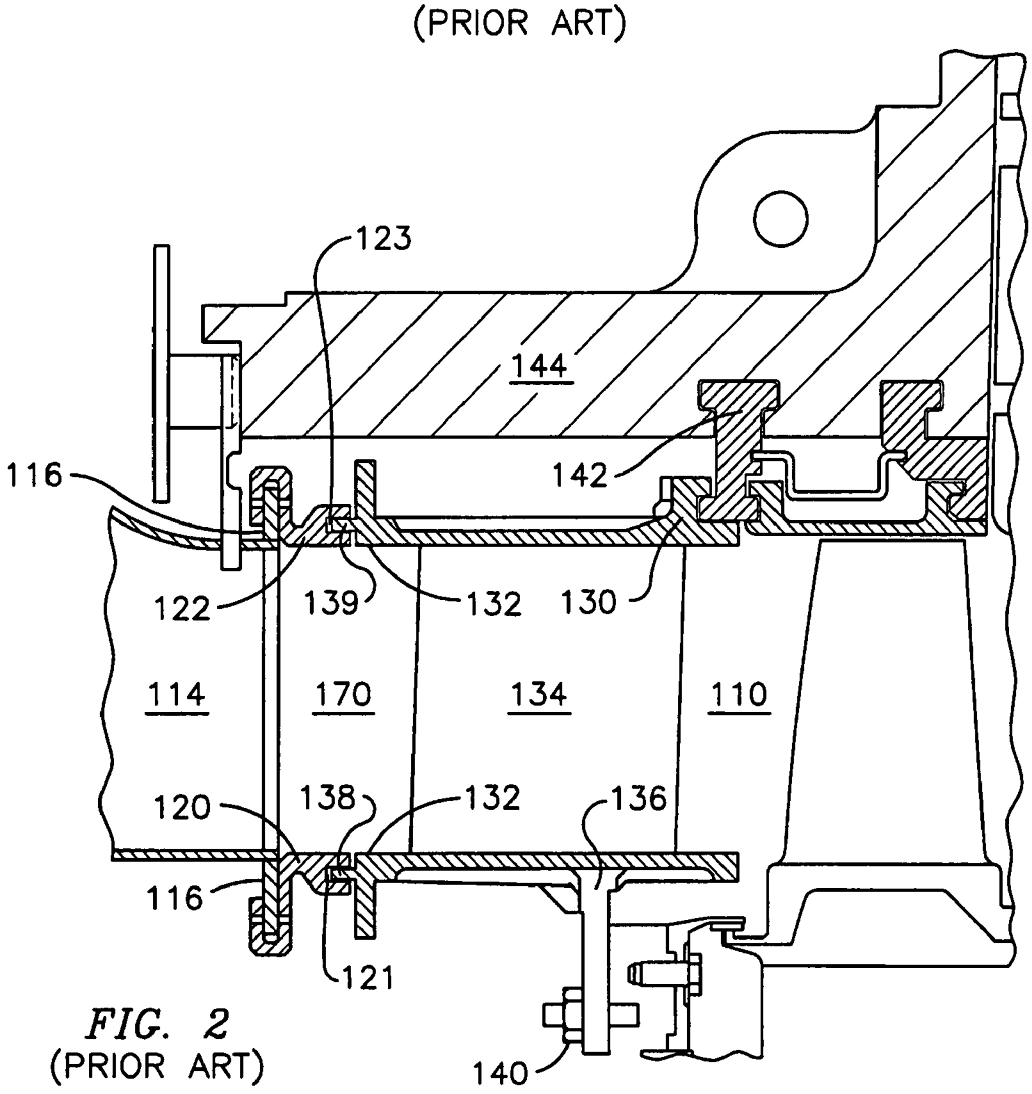
FIG. 2 (PRIOR ART)
FIG. 2 provides a cross-sectional view of the junction of a transition with a front end of a turbine, showing seals in the junction.

Further to conventional aspects of seals provided at such junction 115 of FIG. 1, FIG. 2 provides a cross-sectional view of the junction of a transition 114 (only downstream end shown) with a front end of a turbine 110 (only upstream end shown). FIG. 2 depicts prior art inner and outer seals 120 and 122 for joining an exit flange 116 (alternatively referred to as an exit rail) of transition 114 to a front end 132 of a row 1 vane segment 130. The row 1 vane segment 130 comprises a single airfoil 134 (alternatively referred to as a vane) and is supported along an inner wall 136 by an inner vane attachment structure 140 and at a downstream outer end by an outer vane attachment structure 142 that connects to a row 1 turbine blade ring 144. At each of the forward inner and outer ends the row 1 vane segment 130 comprises a respective upstream lip 138 and 139 that engages a downstream groove 121 and 123 in the respective inner and outer mouth seals 120 and 122. These components surround and define a hot gas path 170 through which combustion gases pass further into the turbine 110 of FIG. 1.

Figure 3A:
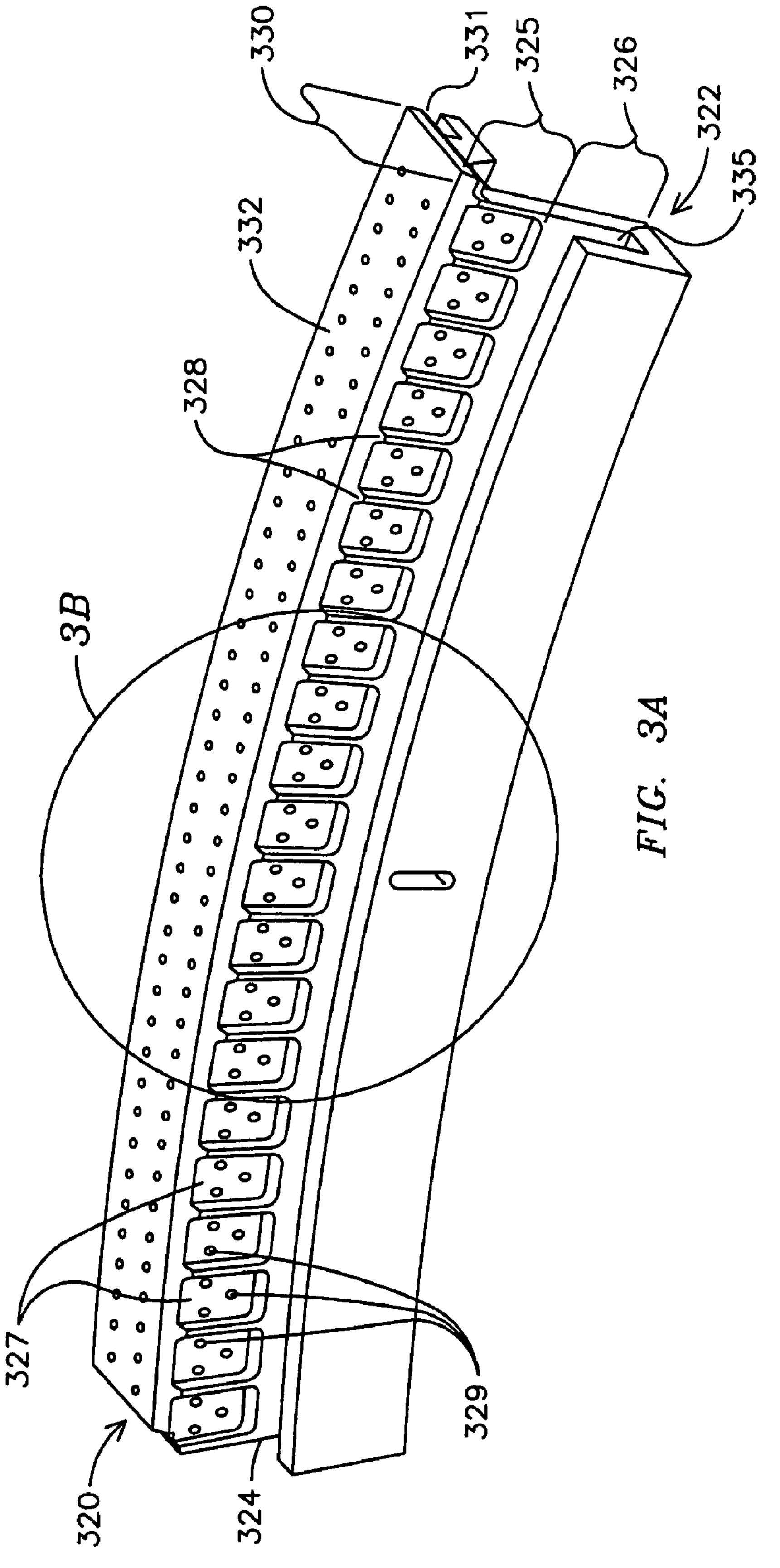
FIG. 3A provides a perspective view of one embodiment of a seal in accordance with the present invention.
Figure 3B:
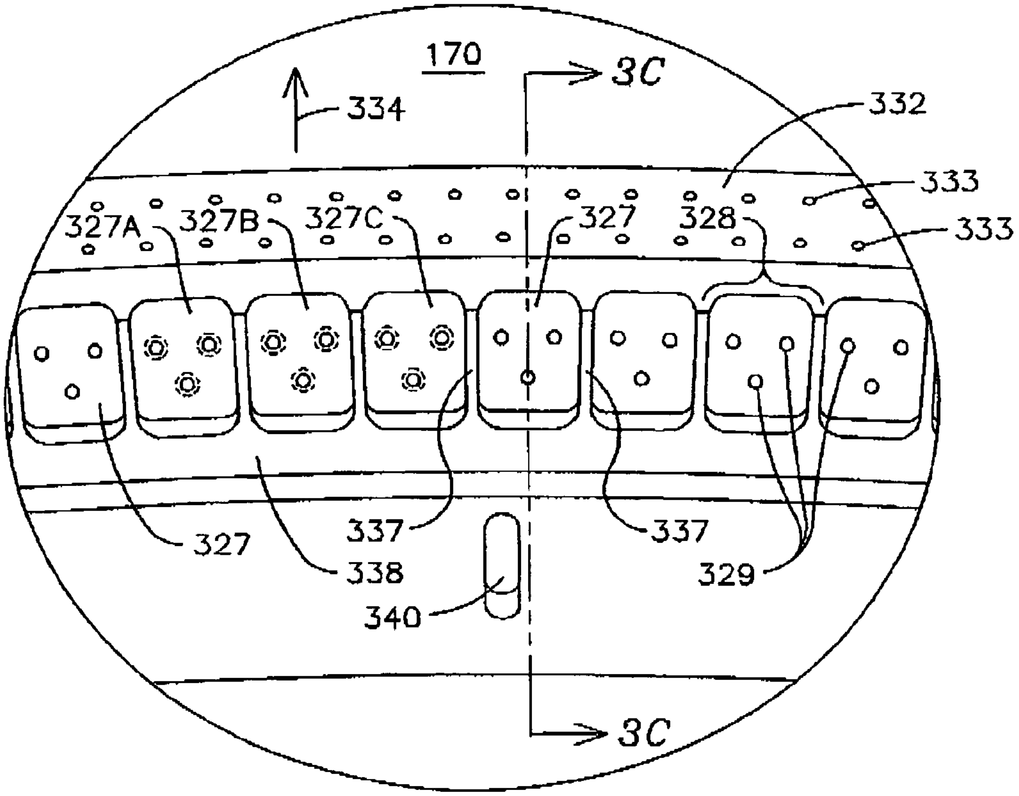
FIG. 3B provides an enlarged view of the region of FIG. 3A enclosed by dashed lines.
Figure 3C:
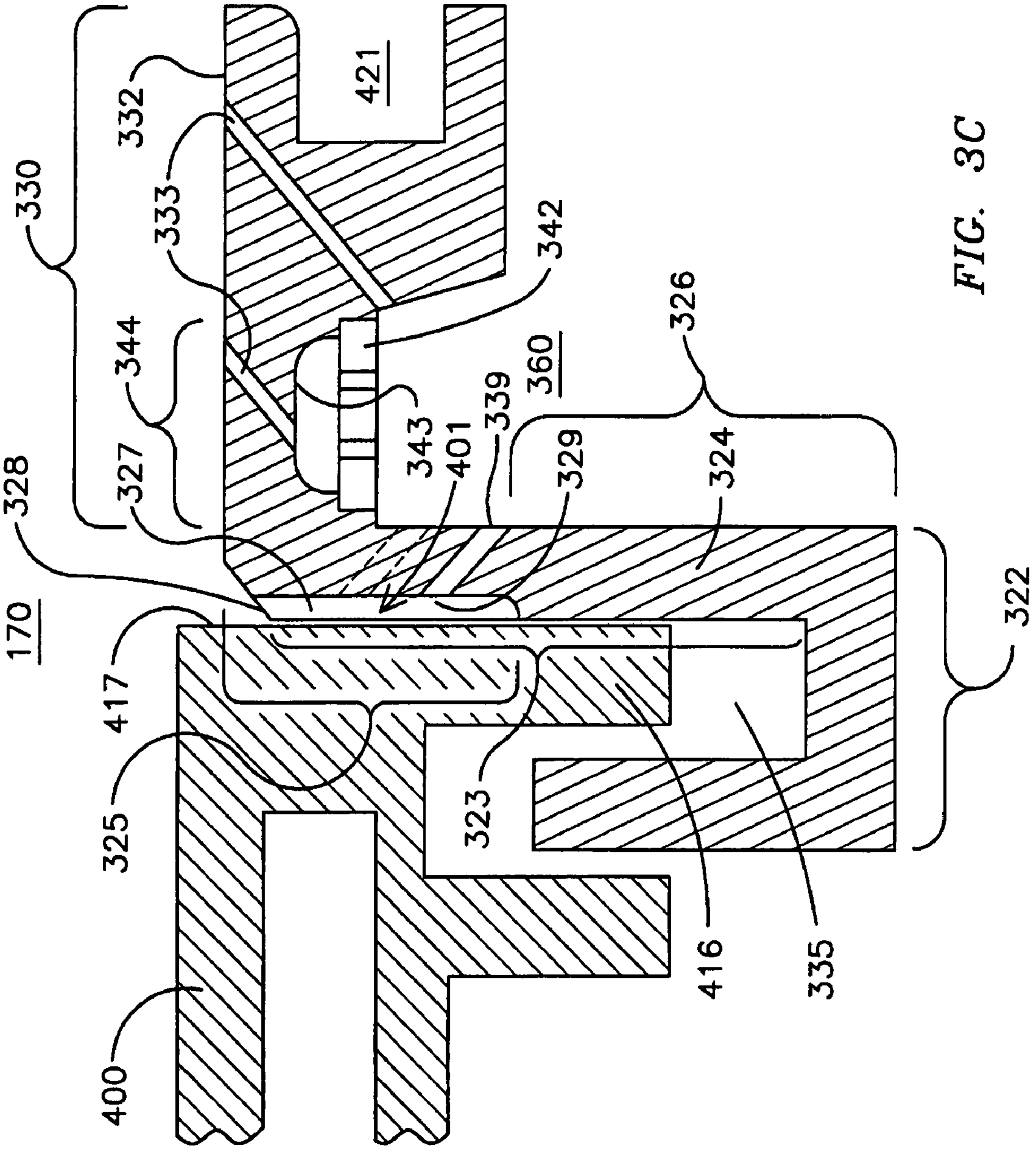
FIG. 3C provides a cross-sectional view of the seal along line C-C in FIG. 3B, in functional association with a downstream portion of a transition.

FIGS. 3A-3C provide views of one exemplary embodiment of the present invention. FIG. 3A provides a perspective view, from an upstream point of view, of a seal 320 such as may be utilized along an inner junction between a transition and a row 1 vane segment of a turbine. Such seal 320 may be used to replace the seal 120 depicted in FIG. 2. Seal 320 comprises an upstream portion 322 that is adapted to receive a transition outlet flange, such as flange 116 of FIG. 2. More particularly, the upstream portion 322 is generally U-shaped in cross-section and defines a groove 335 that receives the noted flange. Upstream portion 322 comprises a primary wall 324, features of which are now described. The primary wall 324 comprises a proximal section 325 and a distal section 326. The proximal section 325 comprises a plurality of recesses 327 which are spaced apart and separated by intervening walls 328. Each recess communicates with one or more outlets 329 of cooling fluid holes (see FIG. 3C for view of entire cooling fluid hole). The outlets 329 communicate via the cooling fluid holes with a supply of compressed cooling fluid, such as compressed air that is provided from the compressor (not shown), and the outlets 329 release this into the respective recesses 327. The source of compressed fluid is described in more detail in the discussion regarding FIG. 3C. The seal 320 also comprises downstream portion 330 downstream of the primary wall 324 and comprising a groove 331 which is adapted to engage a lip (not shown) of a row 1 vane segment (not shown, see FIG. 2). A generally planar exposed surface 332 comprises surfaces of the upstream portion 322 and the downstream portion 330 that are oriented to the hot gas path and is the surface of the seal 320 that is directly exposed in the hot gas path (see FIG. 2). As is generally known in the art, this exposed surface 332 may comprise a number of cooling fluid hole outlets, scoops, and the like, some of which are discussed in regard to FIG. 3C. In various embodiments this exposed surface 332 also may be coated with a thermal barrier coating (TBC).

FIG. 3B provides a frontal view from an upstream point of view of a section indicated by the circled area in FIG. 3A. FIG. 3B more clearly shows the arrangement of the outlets 329. For each recess 327, the arrangement of two of the three outlets 329 closer to the hot gas path 170, and one of the three outlets 329 disposed more distally from the hot gas path 170 and more centrally within the recess 327, provides a higher volume of flow closer to the hot gas path 170 and a graduated increasing flow rate from the more distal to the more proximal areas of the respective recess 327. This staggered arrangement of the outlets 329 provides a relatively effective cooling flow pattern given the primary heat source is the hot gas path 170. Notwithstanding this approach, although depicted to provide three outlets 329 arranged in triangular orientation to one another, this is not meant to be limiting, and other staggered arrangements are within the scope of the claims. Staggered hole arrangements are also preferred for structural reasons, principally to disrupt stress patterns leading to fatigue cracks.

Also, notwithstanding the above specific embodiment, any number of outlets of cooling fluid holes may be provided in each of the recesses. Further, it is noted that the diameter of the cooling fluid holes may be increased relative to other holes and other recesses for the recesses that are positioned upstream of an airfoil of the adjacent row 1 vane segment, which therefore may be affected by a bow wake of the airfoil during operation. For example, if an airfoil as indicated by bold arrow 334 is directly downstream of the recess identified as 327-B, then a bow wake may present a higher pressure at the opening of the recesses 327-A, 327-B, and 327-C into hot gas path 170. In such case, to at least partially compensate for this, the cooling fluid holes for recesses 327-A, 327-B, and 327-C may be provided with larger diameters (example shown as dashed circles) than the other recesses 327 depicted in FIG. 3B. Alternatively, or in combination with the relatively larger cooling fluid holes, more holes may be provided in the recesses upstream of such airfoil than the other recesses 327 depicted in FIG. 3B.

FIG. 3B also shows additional cooling fluid hole outlets 333 arranged on surface 332. These may be provided in a quantity and having diameters that may be affected by the flow coming from outlets 329 of recesses 327. That is, the number and flow of cooling fluid from theses apertures 333 may be less than in conventional seals owing to the increased flow from the outlets 329 from recesses 327 in the present embodiment. In various embodiments the cooling fluid holes leading to outlets 329 may be of a diameter between 1.5 mm and 2.0 mm. Further, in the embodiment as depicted in FIG. 3B, the distal surfaces 337 of intervening walls 328 are coplanar with the engaging surface 338 of distal section 326 of primary wall 324. This provides for more uniform load bearing against the flange (not shown, see FIG. 3C) of the transition that fits into the groove defined by upstream portion 322. This exemplary coplanar arrangement, while not meant to be limiting, provides for an increased mechanical robustness of the seal 320.

Also shown in FIG. 3B is a slot 340 that is designed to receive the shaft of a pin (not shown) that is fit into the transition outlet flange (see FIG. 2). This is done to provide a "safety stop" to prevent circumferential rotation of the seal 320 during operation.

FIG. 3C is a schematic representation of seal 320 taken along line 3C-3C of FIG. 3B, and also includes a cross-sectional schematic representation of a downstream end 400 of a transition, including transition outlet flange 416. In FIG. 3C is shown, along the exposed surface of primary wall 324, a primary wall radial seal length 323 that may be defined as the radial exposed distance that may be contacted by a flange that enters the groove 335. It is noted that since the line 3C-3C is not taken along an intervening wall, the identified intervening wall 328 is in the background, and a gap 401 is identified (between downstream surface 417 and the proximal section 325), a part of which occupies the recess 327. This gap 401 is highly subdivided compared with gaps of prior art embodiments that lack the intervening walls. More clearly viewable in FIG. 3C is the groove 335 as formed within the upstream portion 322, which receives flange 416. Also, a cooling fluid hole 339 in the plane of the section is shown in side view (with dashed lines representing another cooling fluid hole not in the plane of the section). As discussed above in reference to FIG. 3A, the cooling fluid holes 339 communicate between their outlets 329 and a supply of compressed cooling fluid. This supply of compressed fluid is provided via void 360, which is in fluid communication with the compressor (see FIG. 1) and supplies compressed fluid at a higher pressure than the pressure of gases in the hot gas path 170. Cooling fluid, such as compressed air, also flows from void 360 into cooling fluid holes 333 to direct cooling fluid directly into the gas path 170. An optional impingement plate 342 is shown; this provides impingement cooling to an underside surface 343 of a first region 344 of downstream portion 330. It is noted that first region 344 is optional and it is recognized that in some embodiments the latter may be reduced or eliminated, with appropriate design modifications to, or elimination of, the optional impingement plate 342 and/or cooling fluid holes 333.

Further to the cooling characteristics of cooling fluid holes 339, by viewing FIG. 3C it is clear that these cooling fluid holes 339 provide an enhanced cooling to a downstream surface 417 of transition outlet flange 416. This provides better cooling to the flange 416, which will result in less thermal degradation and increased component life. This enhanced cooling is in part due to the outlets 329 being positioned to direct cooling fluid lower (more distal from the hot gas path 170) along downstream surface 417, that is, more radially outward from hot gas path 170. In various embodiments, the outlets 329 are positioned such that at least thirty percent (30%) of the radial seal length 323 receives cooling fluid flowing from the outlets 329. More particularly, in some embodiments the outlets 329 are positioned more radially remote from the exposed surface 332 and the hot gas path 170 such that at least seventy percent (70%) of the radial seal length 323 receives cooling fluid flowing from the outlets 329. Also, it is appreciated that in various embodiments, the outlets 329 are positioned such that between about thirty percent (30%) and about seventy percent (70%) of the radial seal length 323 of the primary wall 324 receives cooling fluid flowing from the outlets 329. This range is not meant to be limiting, and all sub-ranges therein are included in the scope of the invention. It is noted that by positioning the outlets 329 more radially outward from the exposed surface 332 and the hot gas path 170, the embodiment may more effectively achieve the functionality of cooling the transition outlet flange 416 (and consequently achieve the desired lower thermal degradation, lowered wear and longer component life). From a design standpoint, this is balanced with the objective of structural robustness.

Also, the cooling effect provided by such flow is a combination of impingement cooling and convective cooling, and this flow contrasts with expected low flow such as through the groove 335 which is restricted by the close proximity between the distal section 326 and a directly opposing distal section of the transition outlet flange downstream surface 417. Thus, the flow from the outlets 329 into a respective recess 327 provides a flow having an established flow velocity effective to provide a desired cooling greater than the expected flow rate through a relatively stagnant area bounded in part by the distal section 326 where the flow is directed toward the hot gas path 170 and establishes a film cooling flow across the exposed surface 332. Further, in various embodiments the respective outlets 329 provides a selected flow of cooling fluid into the recesses 327 that is effective to purge the gap 401 between the transition outlet flange 416 and the seal 320. This purging reduces the likelihood of hot gas ingestion due to a maintenance of recess-to-hot gas path local pressure gradients.

This approach contrasts with other approaches known in the art. Also, outlets such as these may be designed to be effective to provide an impingement cooling and a convective cooling of the transition outlet flange.

It is recognized that impingement cooling is achieved when a flow of sufficient force, directed toward a surface, is effective to disturb a thermal gradient over that surface. This increases the thermal transfer from the surface. In addition to impingement and convection cooling of the downstream surface 417 (which results in the overall flange 416 remaining cooler), the flow of cooling fluids out of the gap 401 and into the hot gas path 170 purges the gap 401, reducing or eliminating hot gas ingestion due to maintenance of desired local recess-to-hot gas path pressure gradients, and also provides a film cooling effect across the exposed surface 332. The partitioning of the gap 401 into a plurality of recesses 327 better assures the latter two functions.

The overall design, combining the noted features and relationships, provides beneficial cooling of both the transition outlet flange and the seal itself.

Figure 4A:
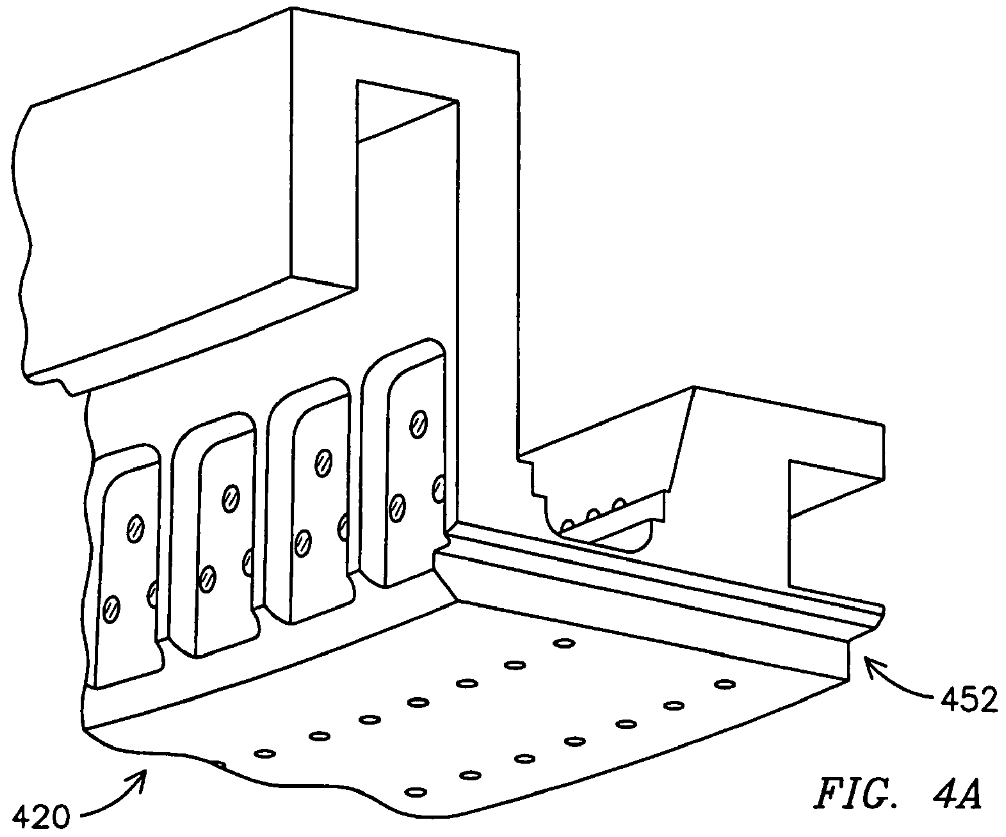
FIG. 4A provides an end perspective view of a seal in accordance with the present invention, showing a female ship lap at the end.
Figure 4B:
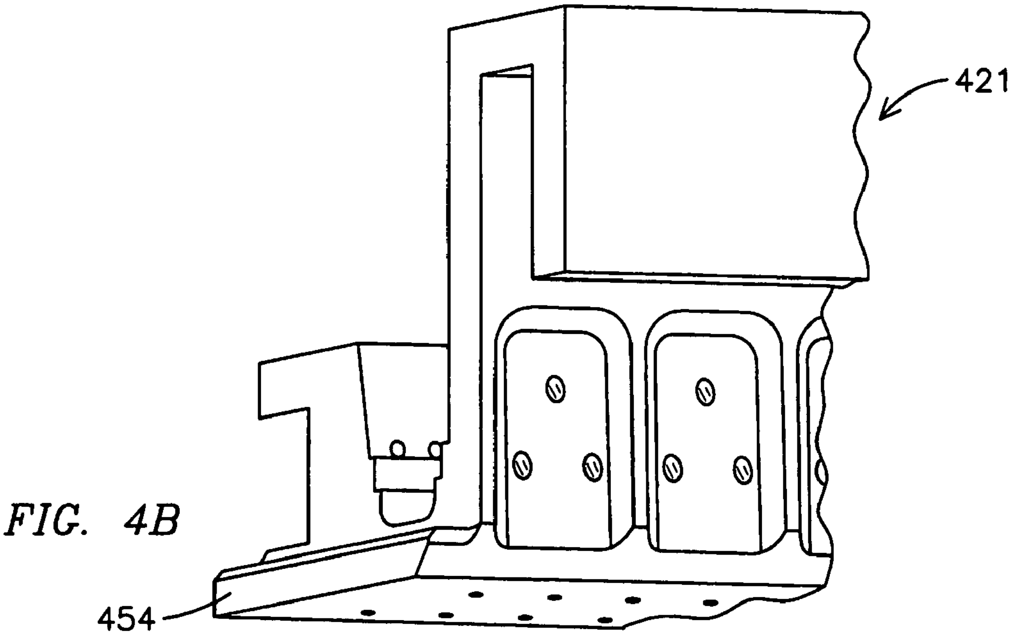
FIG. 4B provides an end perspective view of a seal in accordance with the present invention, showing a male ship lap at the end for mating engagement with the female ship lap shown in FIG. 4A.

FIGS. 4A and 4B show one approach, not meant to be limiting, of reducing undesired leakage of cooling fluid where adjacent transition-to-turbine seals join. FIG. 4A provides an end perspective view of a seal 420 (shown only partially) in accordance with the present invention, showing a female ship lap 452 at the lateral end. FIG. 4B provides an end perspective view of an adjacent seal 421 (shown only partially) in accordance with the present invention, showing a male ship lap 454 at the lateral end for mating engagement with the female ship lap 452 shown in FIG. 4A. Joining of adjacent seals 420 and 421 comprising overlapping and mating lap joints 452 and 454 reduce leakage through the junctions of such components. Joints such as these are effective to reduce overall air flow leakage into the hot air bulk stream and accordingly improve seal performance characteristics.

Also, the term "means for sealingly engaging a transition outlet flange" is taken to include all of the above structural elements of embodiments for effectuating a sealing engagement between the transition-to-turbine seal, of which this means is a portion, and a transition outlet flange. Also, it is recognized that various specific design modifications may be effectuated without departing from the scope of such means. For example, a complete U-shaped design need not be employed for a design of a means for sealingly engaging a transition outlet flange. The "means for directing cooling fluid flows" is taken to include the various depicted embodiments of pluralities of recesses comprising cooling fluid holes with outlets in respective recesses, or analogous defined partitioned areas, each separated by intervening wall structures. More particularly, "means for conveying a respective cooling fluid flow" is taken to include the various depicted embodiments, and variations based on design modifications, of one or more cooling fluid holes in a particular recess or analogous defined partition area. Similarly, "means for restricting" is taken to include the intervening wall structures and analogous structures. A "means for portioning" is taken to include any approach to provide a relatively greater flow to particular regions along a transition-to-turbine seal at the junction of the transition, such as for balancing overall flows given greater back pressures upstream of a turbine row 1 airfoil. Examples include, but are not limited to: greater diameter cooling fluid holes in such upstream areas relative to other areas; more cooling fluid holes in such upstream areas; and combinations thereof.

Also, a "a means for sealingly engaging an adjacent turbine component" is taken to include all of the above structural elements of embodiments for effectuating a sealing engagement between the transition-to-turbine seal, of which this means is a portion, and an adjacent transition component such as the lip of a row 1 vane segment, and various specific design modifications.

Having thusly described aspects and features of particular embodiments, it is appreciated that the invention relates not only to the transition-to-turbine seal apparatuses, such as those described and illustrated, but also to transition-to-turbine seal junctions comprising the transition-to-turbine seals of the present invention, and to gas turbine engines comprising the seals and the transition-to-turbine seal junctions of the present invention.

All patents, patent applications, patent publications, and other publications referenced herein are hereby incorporated by reference in this application in order to more fully describe the state of the art to which the present invention pertains, to provide such teachings as are generally known to those skilled in the art.

While various embodiments of the present invention have been shown and described herein, it will be obvious that such embodiments are provided by way of example only. Numerous variations, changes and substitutions may be made without departing from the invention herein. Moreover, when any range is described herein, unless clearly stated otherwise, that range includes all values therein and all sub-ranges therein. Accordingly, it is intended that the invention be limited only by the spirit and scope of the appended claims.

What is claimed is:

1. A transition-to-turbine seal for a gap between a gas turbine engine transition outlet that comprises a flange having a downstream surface and a row 1 vane segment that comprises an upstream lip, the transition-to-turbine seal comprising:

an upstream portion adapted to engage the transition outlet flange and comprising a primary wall, the primary wall comprising a proximal section comprising a plurality of circumferentially spaced apart recesses open on a radially inward end with respect to a transition central axis, and separated by intervening walls, each said recess in fluid communication with a plurality of outlets of cooling fluid holes formed in the primary wall, the cooling fluid holes in fluid communication with a supply of compressed fluid, wherein said cooling fluid holes direct the compressed fluid in a radially inward angle with respect to the transition central axis, and a distal section providing an engaging surface, the engaging surface and intervening walls being adapted to contact an opposing distal section of the transition outlet flange downstream surface; and a downstream portion comprising a groove adapted to engage the row 1 vane segment upstream lip.

2. The transition-to-turbine seal of claim 1, wherein the surfaces of the intervening walls are coplanar with the engaging surface of the distal section, whereby said coplanar surfaces are effective to prevent the recesses to collapse from the mechanical and thermal loads imposed on the seal.

3. The transition-to-turbine seal of claim 1, wherein the upstream portion is U-shaped in cross section, forming a groove sized to receive the transition outlet flange.

4. The transition-to-turbine seal of claim 1, wherein a number of recesses upstream of an airfoil of a row 1 vane segment are in fluid communication with one or both of relatively larger outlets and more outlets compared to other recesses, effective to at least partially compensate for a bow wake pressure impact from the airfoil.

5. The transition-to-turbine seal of claim 1, wherein the outlets are positioned such that at least thirty percent (30%) of a radial seal length of the primary wall receives cooling fluid flowing from the outlets.

6. The transition-to-turbine seal of claim 1, wherein the particular outlets in fluid communication with a respective recess are in a staggered arrangement with one another.

7. A gas turbine engine comprising the transition-to-turbine seal of claim 1.

8. A gas turbine engine comprising the transition-to-turbine seal of claim 5.

9. A transition-to-turbine seal junction comprising:

an outlet flange of a transition comprising a downstream surface;

an upstream lip of a turbine component; and a transition-to-turbine seal comprising:

an upstream portion adapted to engage the transition outlet flange and comprising a primary wall, the primary wall comprising a proximal section comprising a plurality of circumferentially spaced apart recesses open on a radially inward end with respect to a transition central axis, and separated by intervening walls, each said recess in fluid communication with a plurality of outlets of cooling fluid holes formed in the primary wall, the cooling fluid holes in fluid communication with a supply of compressed fluid, wherein said cooling fluid holes direct said compressed fluid in a radially inward angle with respect to the central axis, and a distal section providing an engaging surface, the engaging surface and intervening walls being adapted to contact an opposing distal section of the transition outlet flange downstream surface: and a downstream portion comprising a groove adapted to engage the upstream lip.

10. The transition-to-turbine seal junction of claim 9, wherein the surfaces of the intervening walls are coplanar with the engaging surface of the distal section, whereby said coplanar surfaces more evenly distribute load and wear.

11. The transition-to-turbine seal junction of claim 9, wherein the upstream portion is U-shaped in cross section, forming a groove sized to receive the transition outlet flange.

12. The transition-to-turbine seal junction of claim 9, wherein a number of recesses upstream of an airfoil of a row 1 vane segment comprises relatively larger and/or more outlets compared to other recesses, effective for providing additional cooling fluid flow effective to compensate for a bow wake pressure impact from the airfoil.

13. The transition-to-turbine seal junction of claim 9, wherein the outlets are positioned such that at least thirty percent (30%) of a radial seal length of the primary wall receives cooling fluid flowing from the outlets.

14. The transition-to-turbine seal junction of claim 9, wherein the outlets are positioned such that between about thirty percent (30%) and about seventy percent (70%) of the radial seal length of the primary wall receives cooling fluid flowing from the outlets.

15. The transition-to-turbine seal junction of claim 9, wherein the particular outlets in fluid communication with a respective recess are in a staggered arrangement with one another.

16. A gas turbine engine comprising the transition/transition-to-turbine seal junction of claim 14.

* * * * *